Figure 1:
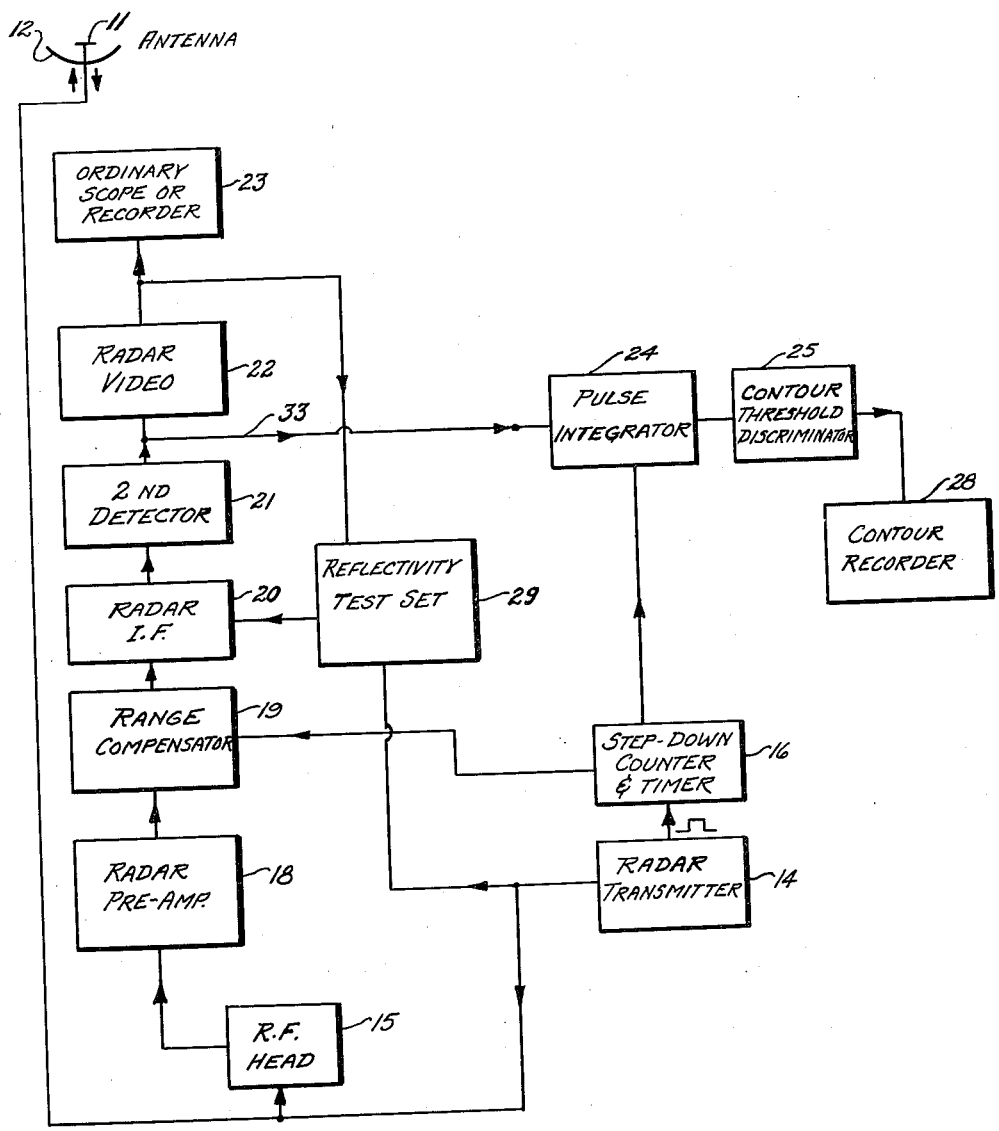

June 12, 1962 D. ATLAS 3,039,088
ANALYSIS OF RADAR METEOROLOGICAL STATISTICAL DATA
Filed April 23, 1956 3 Sheets-Sheet 1

INVENTOR.
DAVID ATLAS

June 12, 1962

D. ATLAS 3,039,088

ANALYSIS OF RADAR METEOROLOGICAL STATISTICAL DATA

Filed April 23, 1956

3 Sheets-Sheet 2

INVENTOR.
DAVID ATLAS

BY Wade Koontz
and Martin J. Finnegan
ATTORNEYS

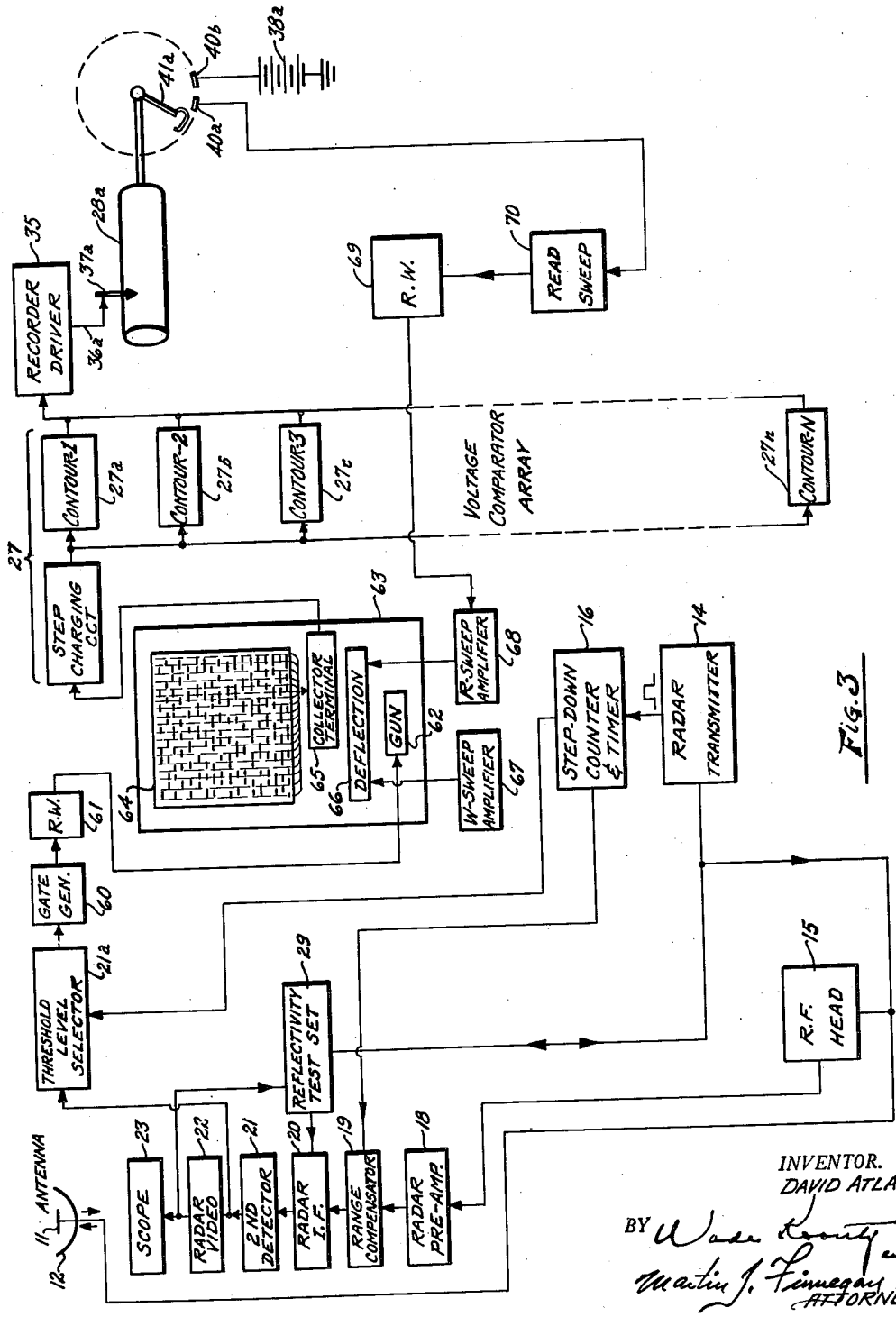

United States Patent Office

3,039,088
Patented June 12, 1962

3,039,088
ANALYSIS OF RADAR METEOROLOGICAL STATISTICAL DATA
David Atlas, 62 Wiswall Road, Newton Centre, Mass.
Filed Apr. 23, 1956, Ser. No. 580,147
5 Claims. (Cl. 343—5)
(Granted under Title 35, U.S. Code (1952), sec. 266)

The invention described herein may be manufactured and used by or for the United States Government for governmental purposes without payment to me of any royalty thereon.

This invention relates to the meteorological analysis of storms, and particularly to the determination of the amount of rainfall that is to be expected from an observed storm or cloud mass.

The invention provides a novel method of converting the density characteristics of selected adjacent laminae of a cloud formation into a visible record (which may be a continuous graph or other suitable form), which method includes the step of projecting an electromagnetic pulse train along the vertical plane intersecting the cloud mass, and the further step of utilizing the pulse echoes returning along said vertical plane to produce a continuous record adapted to indicate, by reference to altitude and time-based coordinates, the successive reflectivity contours, and hence the progressively varying density, of the cloud mass as successive laminae of the cloud mass move across said vertical plane.

The present invention differs from that disclosed in my Patent No. 2,656,531 (Reissue No. 24,084) in that the reflectivity contours are computed and plotted on the basis of an average of a series of independent echo pulses returned in sequence from scattered interception points, whereas the system of the prior patent operated in accordance with the instantaneous pulse amplitude of an echo pulse from a single interception point.

The invention further employs range compensation attenuation operative to insert, at some convenient point along the course of the frequency-modulated receiver circuitry, an attenuation loss proportional to 1/R (wherein the symbol R represents the cloud mass altitude), thus eliminating altitude differences as a factor in the measurement of the reflectivity of the cloud mass whose density is to be determined. In this connection the invention also employs servo mechanism for adjusting the gain of the receiver circuitry to compensate for changes in cloud reflectivity. Thus the invention incorporates range compensation and reflectivity compensation procedures whose combined effect is to improve the accuracy of the recorded density data by rendering the echo pulse receiving circuitry automatically self-corrective whenever it is confronted with changes in altitude or in the reflectivity factor.

Figure 2:
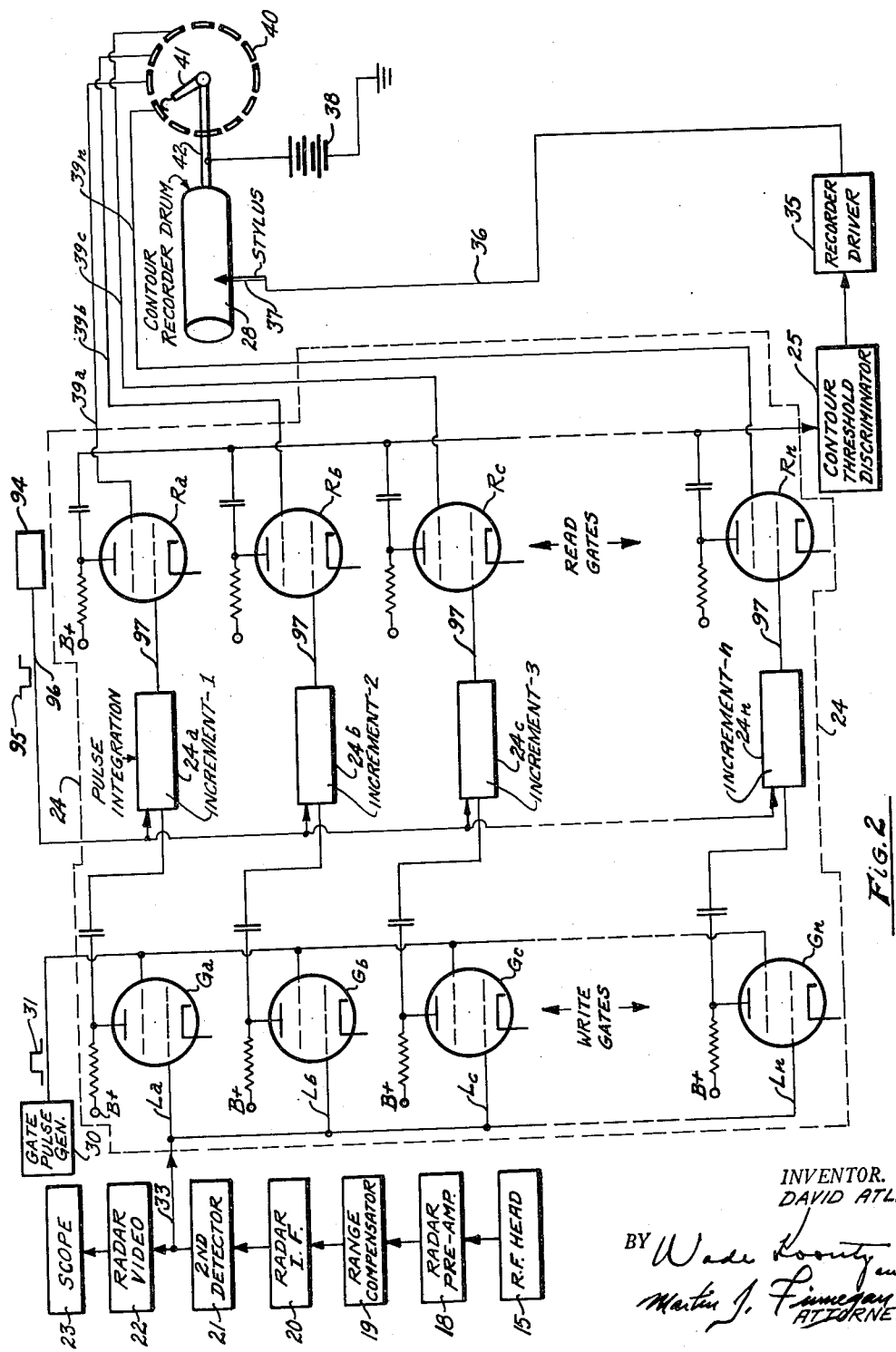

The invention also embraces the herein disclosed means for putting into execution the novel methods of operation and procedural techniques above referred to, and explained in detail in the following description of the invention as illustrated in the accompanying drawings wherein:

FIG. 1 is a block diagram of apparatus in which the invention may be embodied; and FIG. 2 is a diagram illustrative of an alternative arrangement of circuitry adapted for incorporation into the scheme illustrated in FIG. 1; FIG. 3 illustrates another embodiment of the invention.

Other things being constant, the average echo pulse power in a series of independent pulses received from a group of scatterers in a pulse volume is proportional to the reflectivity of that group. Thus, an integration of the series of independent pulses returned from the group of scatterers is a direct measurement of the reflectivity. Alternatively, it is sometimes less difficult to count the number of pulses above or below one or more threshold levels than to average them. The number of independent pulses which cross such thresholds (or fall between various pairs of thresholds) is a function of the average echo intensity of all the pulses (or the integrated intensity) and of the statistical probability distribution of independent pulse amplitudes. For a group of scatterers distributed randomly in space (in the pulse volume), such as cloud or precipitation particles or scatterers having other known distributions and motions in space, it is possible to determine the theoretical probability distributions of a time series of echo pulse amplitudes (or in a region of scatterers distributed homogeneously through a number of pulse volumes, the series of pulses from independent pulse volumes). Thus, the threshold counts made on the actual echo pulses may be compared to the known theoretical distribution expected for known values of average echo intensity to deduce the average echo intensity, and therefrom, the reflectivity of the group of scatterers. This disclosure is intended to cover both methods of measuring average echo intensity: (A) A direct integration of the series of (independent) pulses in time (or space if the scatterers are uniformly distributed over a number of independent pulse volumes). (B) A count (or counts) of pulse amplitudes based on predetermined probability distributions of pulse amplitudes.

This reflectivity contour plotter may be used either with a fixed beam radar pointing (for example, but not necessarily) overhead to give the reflectivity structure on a time-altitude record of the scatterers passing through the beam; or it may be employed with the usual scanning beam radars to show the space distribution of reflectivity throughout the echoing region, provided that the beam is made to scan sufficiently slowly so that a sufficiently large (statistically representative) sample of independent pulses may be received from each pulse volume in the echoing region.

The radar reflectivity $\eta$ of a region of cloud or precipitation is given by the relation $$\eta = \frac{K\overline{P_r}R^2}{P_t} \quad (1)$$

wherein K is a proportionality constant and $\overline{P_r}$ is the average (or statistical expectancy) of the received echo power from a particular pulse volume (i.e. the volume defined by half the pulse width in space and the extent of the beam between half power points) at a range R when the peak transmitted power is $P_t$. If E is the video or output voltage of the radar (assuming a linear second detector), then $\overline{P_r}$ is proportional to $\overline{E^2}$. If furthermore, G is the overall gain of the receiving system, then $$\eta = \frac{K'R^2\overline{E^2}}{G^2P_t} \quad (2)$$

where K' is a modified proportionality constant.

In applying the invention to the function of determining the density of a cloud formation directly above a fixed point of observation, the antenna 11 and parabolic reflector 12 (FIG. 1) serve (in conjunction with transmitter 14) as radiating and receiving means for the transmission of radiant energy, in pulse form, and the reception of so much of the pulse energy as is reflected back by the moisture content of the overlying cloud bank; both the transmission and return reflection being in a vertical path.

The received echo goes through the R.F. (Radio Frequency) head 15 and through the I.F. pre-amplifier 13. The range compensator 19 deamplifies the signal voltages inversely as the range from which they were received so that its output is a function only of the actual reflectivity in the cloud pulse volume (neglecting atmospheric attenuation and variations in overall system sensitivity). As already mentioned, the range compensator 19 may be inserted almost anywhere in the chain of amplification provided only that no non-linear amplification occurs before range compensation. The compensator may also be incorporated in the output of either the contour threshold discriminator 25 or the counting display system 27 to modify the threshold printing levels for the reflectivity contours according to their range. The output of the range compensator 19 goes through the I.F. amplifier 20 and the second detector 21 from where said output in directed to the final video stage 22 (feeding the ordinary scope or recorder 23).

The purpose of the step down counter and timer 16 is to select either every pulse, or every second, third, fourth, etc. pulse for computation by the contour computing and plotting system inasmuch as the pulse repetition frequency of the transmitter may be so high as not to permit the particles in the pulse volume to be rearranged in a random manner completely independent of their arrangement at the time of the previous pulse. The count down ratio is selected so that the contour computing system operates only on independent pulses. The operation of the system is not critically affected by the removal of the step-down counter 16, but, for example, four times as many pulses must be computed by the contour computing system 17 if only every fourth pulse is truly independent, in order to obtain the same computational accuracy.

The contour computing and plotting system may be comprised of pulse integrator 24, contour threshold discriminator 25, and contour recorder 28. In the first alternative, pulse integrator 24 adds up the pulse voltages of perhaps 50 (or 100 or any other chosen number) of independent pulses at each and every range increment throughout the cloud (along the beam) corresponding to each pulse volume of scatterers in the cloud. The exact manner of construction of pulse integrator 24 is not critical. It may consist of an array of several hundred separate integrating circuits each adding up the signal contributed by an increment of range equal to half the pulse width in space (i.e. the radial depth of the pulse volume). Three of such separate integrating circuits are indicated at 24a, 24b, 24c in FIG. 2, with the final integrator of the array being indicated at 24n. The integrators 24a to 24n receive the voltage outputs of gating tubes $G_a$ to $G_n$, respectively, (FIG. 2) as these tubes are gated in coincidence by pulse 31 issuing from gate pulse generator 30, whose pulse repetition rate is determined by timer 16 (FIG. 1). "Write" gates G are conditioned for gating by pulses delivered to their respective conditioning grids by way of grid leads $L_a$ to $L_n$, all of which are multipled with output lead 33 from the second detector 21. "Read" gates $R_a$ to $R_n$ are similar, and receive their conditioning pulses from ranged integrator 24a to 24n, respectively, the latter being reset after each integration cycle by application thereto of a clearing pulse 95 conducted over line 96 from multivibrator 94. Gates $R_a$ to $R_n$ are successively gated by current impulses carried over leads 39a to n, in sequence, as rotating brush 41 sequentially engages segments 40, at one end of the recorder drum 28. Thus the drum's stylus 37 will print on the drum's chart a series of graphs corresponding in contour to the voltage pattern picked off the "read" gates, and delivered to stylus 37 by way of contour threshold discriminator 25, recorder driver 35, and lead 36.

Contour threshold discriminator 25 sets a number of discrete voltage levels by directing the total echo signal into discriminating channels of progressively increasing degrees of amplification corresponding, for example, to those shown at 60 to 63, inclusive, in my prior Patent Number 2,656,531 (above referred to), which voltage levels are supplemented, in the plus or minus direction, by a small voltage increment which, when matched by the output of the pulse integrator, causes a signal to pass to the recorder driver 35, and thence to the stylus 37. Thus, as the cloud passes over the fixed beam antenna reflector 12, or as a rotating beam scans through a cloud, a number of discrete contours corresponding to equal pulse integrator outputs, or cloud reflectivity, are plotted on recorder drum 28, to produce thereon a map of the entire detectable cloud region.

Alternatively, as indicated in FIG. 3, the contours may be plotted by delivery to stylus 37a of the voltage pattern picked off the screen of a cathode ray storage tube. Referring to FIG. 3, the output of second detector 21 goes to threshold level selector 21a which quantizes the level of the signals to be displayed on storage tube screen 64 in successively "written" horizontal rows, each of which rows corresponds to a particular one of the plurality of threshold levels into which the total echo signal content was divided, as it passed through selector 21a. These displayed signals are subsequently read off the screen by successive vertical sweeps progressively across the screen surface; the deflection electrodes 66 of the tube 63 being supplied with actuating voltage, alternately, from "write" and "read" circuits 67 and 68, respectively, the alternating sequence being under the control of alternately operating switching devices 61 and 69, the said switching devices being in turn cycled by the cycle initiating units 60 and 70, respectively.

The purpose of range compensator 19 is to eliminate the altitude of the cloud as a factor in the measurement of the cloud's moisture content. The compensating circuitry 19 inserts an attenuation factor that is proportional to the reciprocal of the altitude, over the selected range. It complements the reflectivity test set 29, which is a receiver gain control unit of conventional character, corresponding to that indicated at "50" in my prior Patent Number 2,656,531 (above referred to), and including a conventional slow-acting servo circuit operating to vary the gain of the receiver 15 to keep $G^2P_T$ constant ($P_T$ being the transmitted power and G the receiver gain).

What I claim is:

1. Means for transmitting a train of pulses for interception by a cloud mass, means for receiving the echo pulses reflected by said cloud mass, means for directing the returning echo pulses against an amplitude threshold, means for detecting that portion of the returning pulse energy which is in excess of said amplitude threshold, and means for recording a series of impressions in a visual pattern having indicia whose characteristics vary in accordance with variations in the amplitude and number of threshold-exceeding pulses in the energy previously detected.

2. Means for transmitting a train of pulses for interception by a cloud mass, means for receiving the echo pulses reflected by said cloud mass, means for directing the returning echo pulses against an amplitude threshold, means for storing in successive parallel arrays a sequence of signals representative of the returning pulse energy which is in excess of said amplitude threshold, means for collecting the stored energy in successive sweeping operations, each of which sweeps across all of said parallel arrays, and means for recording a series of impressions in a permanently visual pattern conforming, in its contours, to the pulse reflectivity characteristics of said cloud mass, as represented in the signals previously stored and collected.

3. Means for determining the density of a storm cloud overlying a fixed ground station, means for transmitting a train of pulses from said station in a vertical direction, means for receiving the return echo pulses reflected by the moisture content of said storm cloud, means for integrating the return pulse energy, means for subjecting said integrated energy to a voltage-matching operation to determine whether the integrated signal amplitudes coincide with any one of a group of standard voltage values, representative of progressively different cloud reflectivity coefficients, and means for recording each occurrence of the voltage-matching condition.

4. Means for determining the density of a storm cloud overlying a fixed ground station, means for transmitting a train of pulses from said station in a vertical direction, means for receiving the return echo pulses reflected by said storm cloud, means for storing said pulses in a predetermined number of sequential positions, means for applying the stored pulse charges successively to a voltage-matching operation, to determine whether their amplitudes coincide with any one of a group of standard voltage values, representative of progressively different cloud reflectivity coefficients, and means for recording each occurrence of the voltage-matching condition.

5. Means for determining the density of a cloud mass overlying a fixed ground station, comprising a recording medium, means for impressing a series of contour indications on said recording medium at intervals spaced, one from another, to represent progressively higher signal levels indicative of progressively heavier cloud density, means for developing voltage values proportional to the strength of the average echo signal intensity reflected from said cloud mass, and means for causing said impressing means to apply markings corresponding to individual contour indications whenever said voltage values coincide with the signal levels corresponding thereto.

References Cited in the file of this patent

UNITED STATES PATENTS

| | | |
|---|---|---|
| 2,492,120 | Smith | Dec. 20, 1949 |
| 2,612,550 | Jacobi | Sept. 30, 1952 |
| 2,705,319 | Dauber | Mar. 29, 1955 |
| 2,765,405 | Gamarekian | Oct. 2, 1956 |
| 2,779,869 | Gerks | Jan. 29, 1957 |